June 1, 1965 H. H. RIDDERVOLD 3,186,060
PREREGISTERING OF CURVED STEREOTYPE PRINTING PLATES
Filed May 7, 1962 10 Sheets-Sheet 1

INVENTOR
Hans H. Riddervold
by Wenderoth, Lind & Ponack
Attorneys

June 1, 1965 H. H. RIDDERVOLD 3,186,060
PREREGISTERING OF CURVED STEREOTYPE PRINTING PLATES
Filed May 7, 1962 10 Sheets-Sheet 2

INVENTOR
Hans H. Riddervold
By Wenderoth, Lind & Ponack
ATTORNEYS

INVENTOR
Hans H. Riddervold

INVENTOR
Hans H. Riddervold

June 1, 1965 H. H. RIDDERVOLD 3,186,060
PREREGISTERING OF CURVED STEREOTYPE PRINTING PLATES
Filed May 7, 1962 10 Sheets-Sheet 6

INVENTOR
Hans H. Riddervold
by Wenderoth, Lind & Ponack
Attorneys

June 1, 1965 H. H. RIDDERVOLD 3,186,060
PREREGISTERING OF CURVED STEREOTYPE PRINTING PLATES
Filed May 7, 1962 10 Sheets-Sheet 7

INVENTOR
Hans H. Riddervold by Wenderoth, Lind & Ponack
Attorneys

INVENTOR
*Hans H. Riddervold* by *Wenderoth, Lind & Ponack*
Attorneys

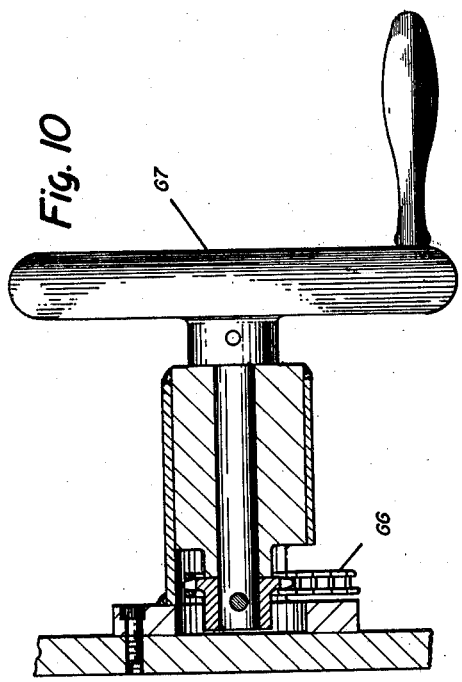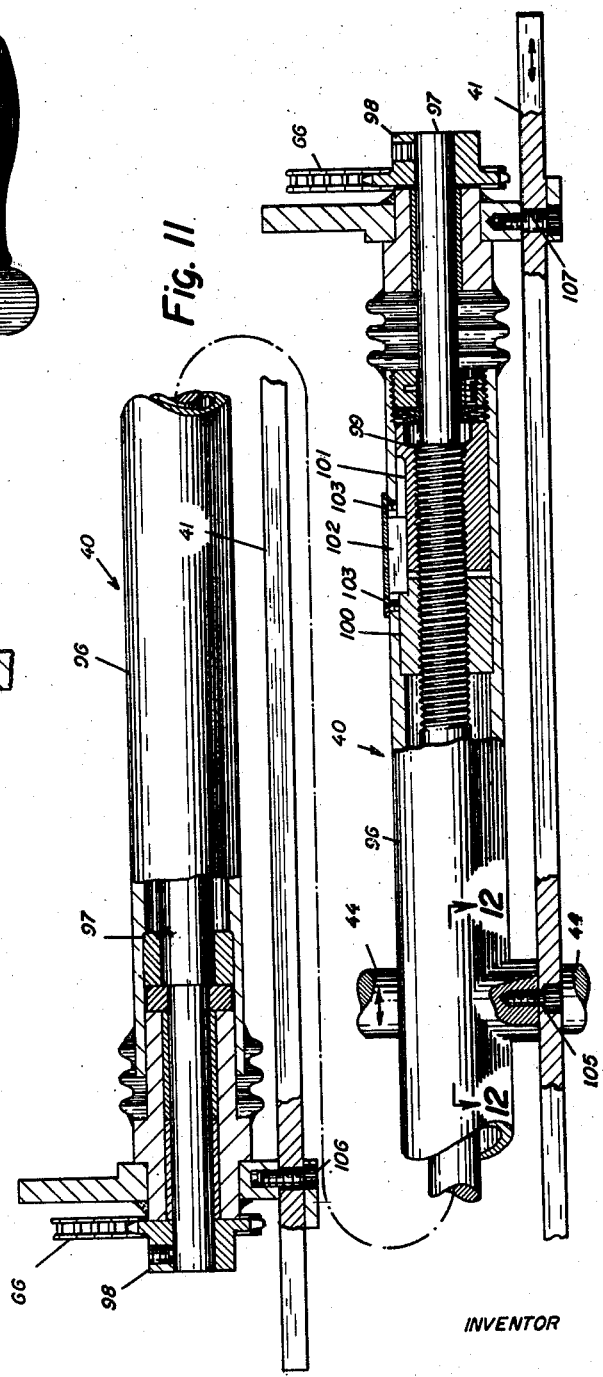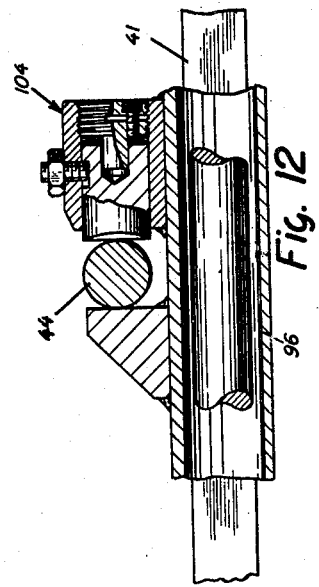

United States Patent Office 3,186,060
Patented June 1, 1965

3,186,060
PREREGISTERING OF CURVED STEREOTYPE
PRINTING PLATES
Hans H. Riddervold, Gullkroken 5, Oslo, Norway
Filed May 7, 1962, Ser. No. 192,666
7 Claims. (Cl. 29—21)

This invention relates to an improved apparatus for registering and trimming curved stereotype printing plates for use in rotary printing presses.

An object of the invention is to automatically feed such printing plates through the registering and trimming mechanism by feeding the plates into the machine with the transport rolls arranged upon an inclined path.

A further object of the invention is to provide a control so that when the plate reaches a central portion of the inclined path it is lowered upon a support and secured thereto by means of a vacuum at which time the plate in such position is trimmed at its edges.

A further object of the invention is to provide a support for the plate which may be adjusted by projected register marks registered on clocks upon setting rings.

A still further object of the invention is to provide means whereby after setting the edges of the plate such edges are machined by four cutting means or milling cutters which operate simultaneously and which do not return after treating one plate but return in treating the following plate.

A still further object of the invention is to provide means for releasing the plate after preregistering by raising the support at the central portion of the path traversed and then allowing such plate to leave along the inclined transport rolls.

With the above and other objects in view which will become apparent from the detailed description below a preferred form of the invention is shown in the drawings in which:

FIGURE 10 is a sectional view of one of the hand wheels.

FIGURE 11 is a view partly in elevation of the means for moving the plate support shown in two broken away parts for greater clarity, and FIGURE 12 is a sectional view through section line 12—12 of FIGURE 11.

Figure 1:
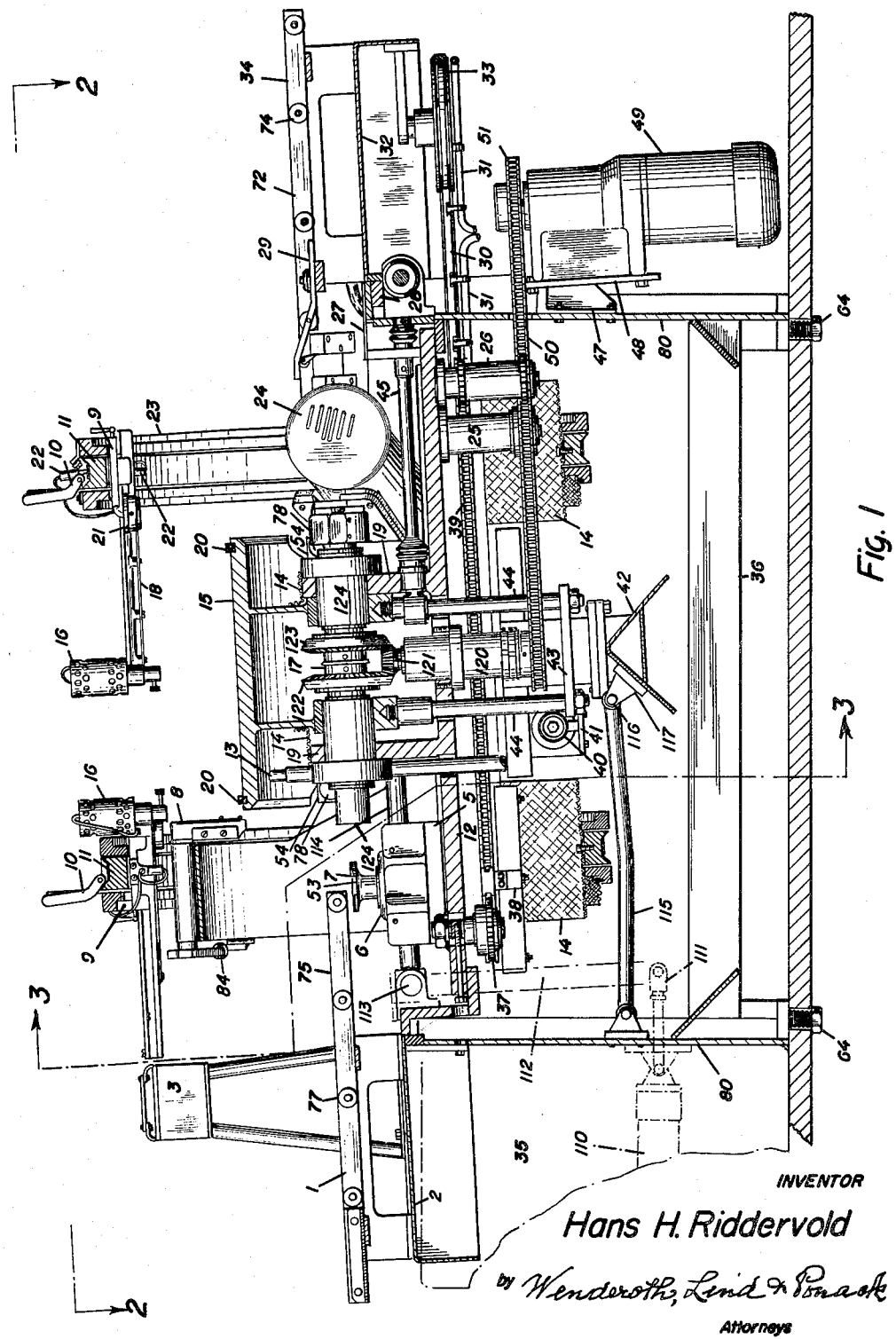
FIGURE 1 is a vertical cross-sectional view with parts in elevation through the entire machine.

In color printing, a plurality of plates are used to print each cut and each of the several plates are inked with a different color. Unless such plates are in exact register with each other, multiple impressions, blurring and off-color images are produced in the printed reproductions. To avoid these difficulties each plate has been preregistered by register marks and trimming means such as disclosed in Patent No. 2,668,346 granted February 9, 1954 to Paul L. Tollison et al. However, in such machines each plate must be individually placed in position and removed and the improvement of the present invention involves an automatic feed of the plates through the machine and during their passage through the machine the plates are preregistered and trimmed.

The semi-circular color plates are fed into the machine along the inclined path 34 comprising two spaced bars 72 and 73 upon which spaced supporting rollers 74 are mounted for supporting the lower parallel edges of the plate. After pre-registering and trimming, the plates are discharged from the machine by a similar construction comprising the bars 75 and 76 provided with rollers 77 forming the discharge end 1.

Figure 2:
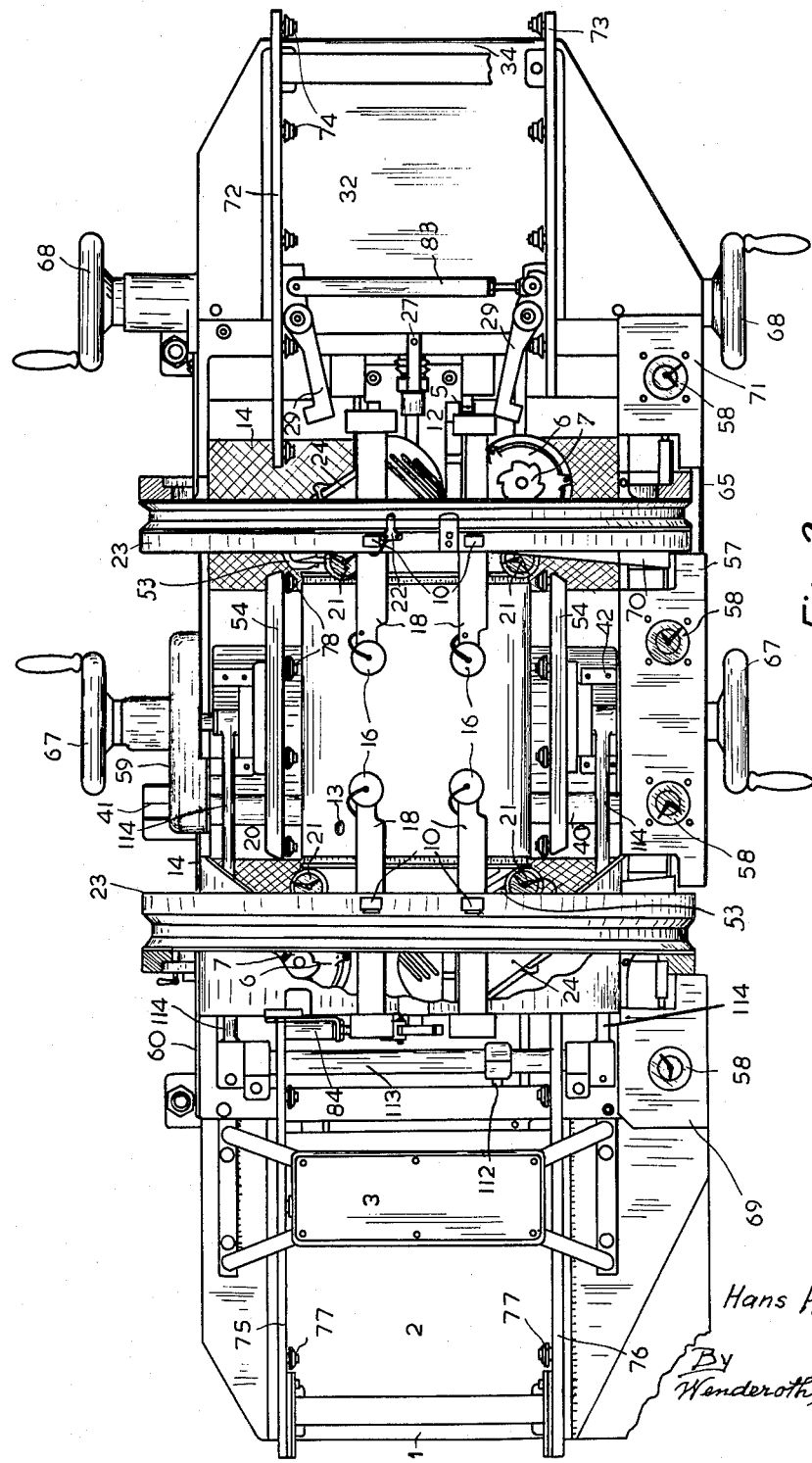
FIGURE 2 is a plan view taken upon section line 2—2 of FIGURE 1 looking in the direction of the arrows.

The plate coming from the entrance 34 moves to the lifting rails 54 provided with rollers 78 as shown in FIGURE 2 and is stopped in such position by the stopping means 8. The rails 54 are inclined with reference to the base as shown in FIGURE 1. The rails 54 are then lowered to allow the plate to be supported by the support 15 and is secured thereto by a vacuum applied through a vacuum pipe 13. A packing 20 of foam rubber is provided on the support 15 for securing a tight fit.

The position of the first one of a set of plates is registered on the clocks 21 as the projection lamps 16 are adjusted according to the marks on the plate.

The feeding motor 49 is then started together with the four cutting motors 6 and 24. The motors 6 are moved by the feeding motor 49 along the two straight sides of the plate thereby trimming such sides and the motors 24 are moved along the two semi-circular sides of the plate thereby trimming such sides. The opposite motors 6 and 24 move respectively in opposite directions. The vacuum attachment of the plate to the support 15 is then released as well as the lifting rails 54 and the plate is moved upwardly to be discharged from the machine along the rollers 77 of the discharge end 1.

The eight clocks 21 and 58 permit recovering the accurate position of the plate at any time. The further plates in the set are adjusted to the registering marks by means of the projection lamps 16 and by the operation of the adjusting means controlled by the wheels 68 and 67.

The brace 36 braces the feet 80 of the frame 28 supporting the various elements of the machine. A bed 12 is supported from the frame members 28. At the front end a table 32 is provided and at the rear end or discharge end 1 a table 2 is fixed to the frame. The switch box 35 is located at the rear end of the machine under the discharge end 1. The legs on the machine are secured by the bolts 64. At the front end there is a front plate 80 and at the rear end a rear plate 80'.

The motor 49 is mounted on a support plate 48 carried by a bracket 47 secured to a leg 80.

The motor 49 is provided with a gear 51 for driving the chain 50. The chain 50 drives the chain wheel 26 which in turn drives the chain 39. The wheel 25 serves as a support for the chain belt 50.

The motors 6 are mounted on slides 5 which are reciprocationally slidable upon a bed 12. The slides 5 are by clamps 38 clamped to the chain belt 39 in such a way, that the belt 39 driven by the motor 49, moves the slides 5 in opposite directions. The belt 39 runs over a tightening wheel 37. A belt 30 passing over a tensioning wheel 33 serves as a supporting belt for the electrical leads 31 going to the motors 6.

A control box 3 is located above the table 2.

The rails 54 are designed to lower the plate to be secured by vacuum upon the support 15 and move it to edge cutting and trimming position. The means for lifting and lowering the rails 54 are indicated generally at 42 as particularly shown in FIGURE 3.

The transmission for moving the motors 24 carrying the semi-circular cutters 53 semicircularly so as to cut and trim the semicircular edges of the plate is indicated at 17. Supporting bearings 19 are provided for the shafts 124 from the transmission 17. A slide for the projection lamps 16 is shown at 9 and a brake or lock for the register rings 23 is indicated at 10. The projection lamps 16 are mounted on arms 18.

The support 15 may be turned on the shafts 124 by operating one of the wheels 67 which over chains 66 and chain wheels 98 rotate a shaft 97 which is threaded and cooperates with nuts 100, 101 so that a tube 96 may be longitudinally moved and thereby moving the bolts 44 fastened to the support 15 transversely. See FIGURE 11. The support 15 may be longitudinally moved on the shafts 124 by operating one of the wheels 68 which over a transmission move longitudinally a shaft 45 which cooperates with one of the bolts 44.

Screening or shielding means 14 are indicated for protecting the mechanism of the support 15 from cutting shavings.

Register rings are indicated at 23 and a lamp contact brush 22 contacts the conducting ring 11. The projecting lamps 16 are supported and set on the register rings 23.

Figure 6:
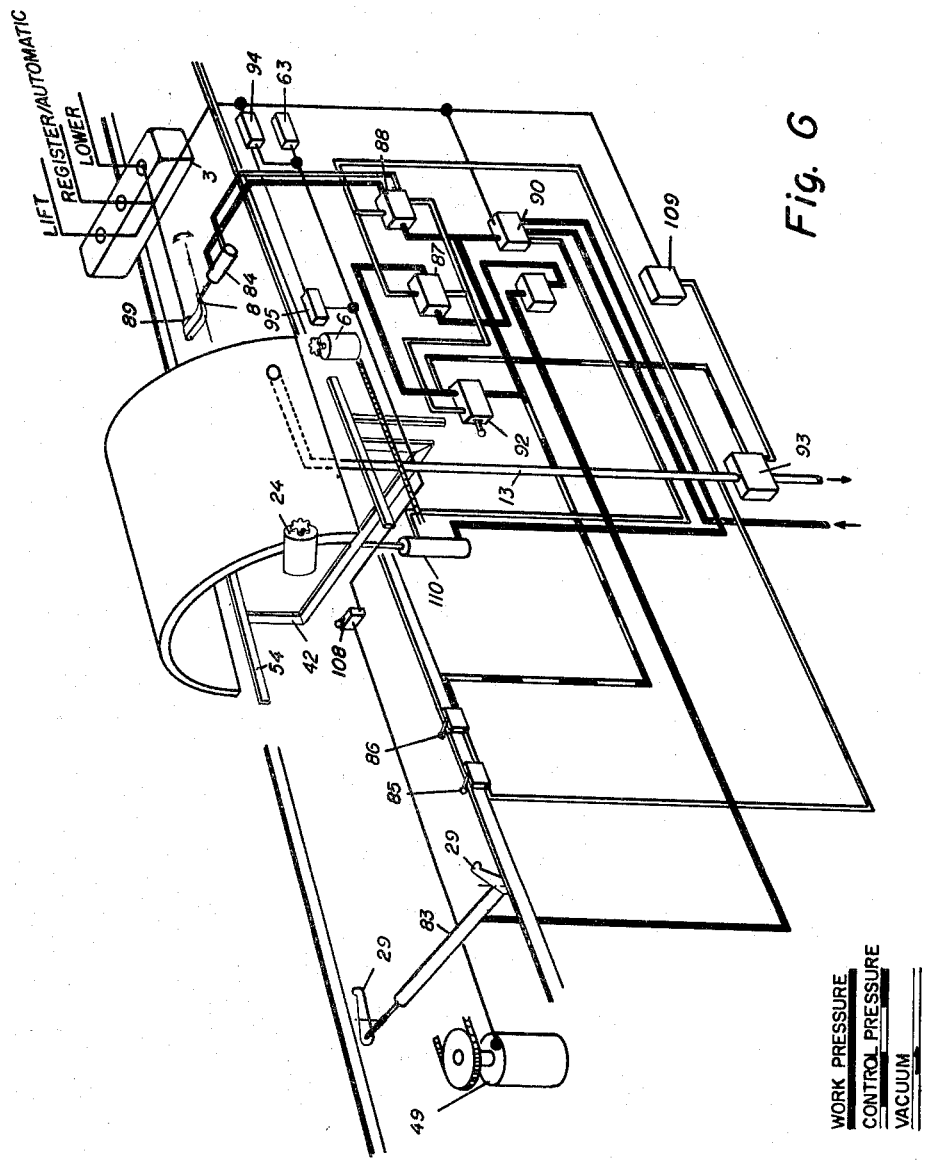
FIGURE 6 is a diagrammatic view of the controls of the machine.

The pivoted elements 29, shown more particularly in FIGURES 2 and 6 are located at the end of the entrance and will stop the plate being fed until everything is in order for it to proceed through the machine.

A collector 52 is provided for the shavings from the cutters 53.

Plates 69 and 71 carry the measuring clocks 58. 70 is a lateral transfer cam 70 (see FIGURE 2) transferring the movement of the ring 23 to a feeler of the clock 58.

A cover plate 57 is provided for the measuring clock 58 and a chain housing 59 as shown in FIGURE 2 is provided adjacent the back plate 60.

On one of the slides 5 is secured operating means 61 which operates a microswitch 63.

The two hand wheels 67 are connected to the shaft 40 by the chains 66 which in turn is connected to the shaft 41 as shown particularly in FIGURES 10, 11 and 12. The support 41 may reciprocate in accordance with the movement of the tube 40 and will indicate the transverse movement of the support 15. As shown in FIGURE 12 the rod 44 is secured between abutting members upon the tube 40 and the rods 44 convey the transverse movement desired to the support 15.

Figure 3:
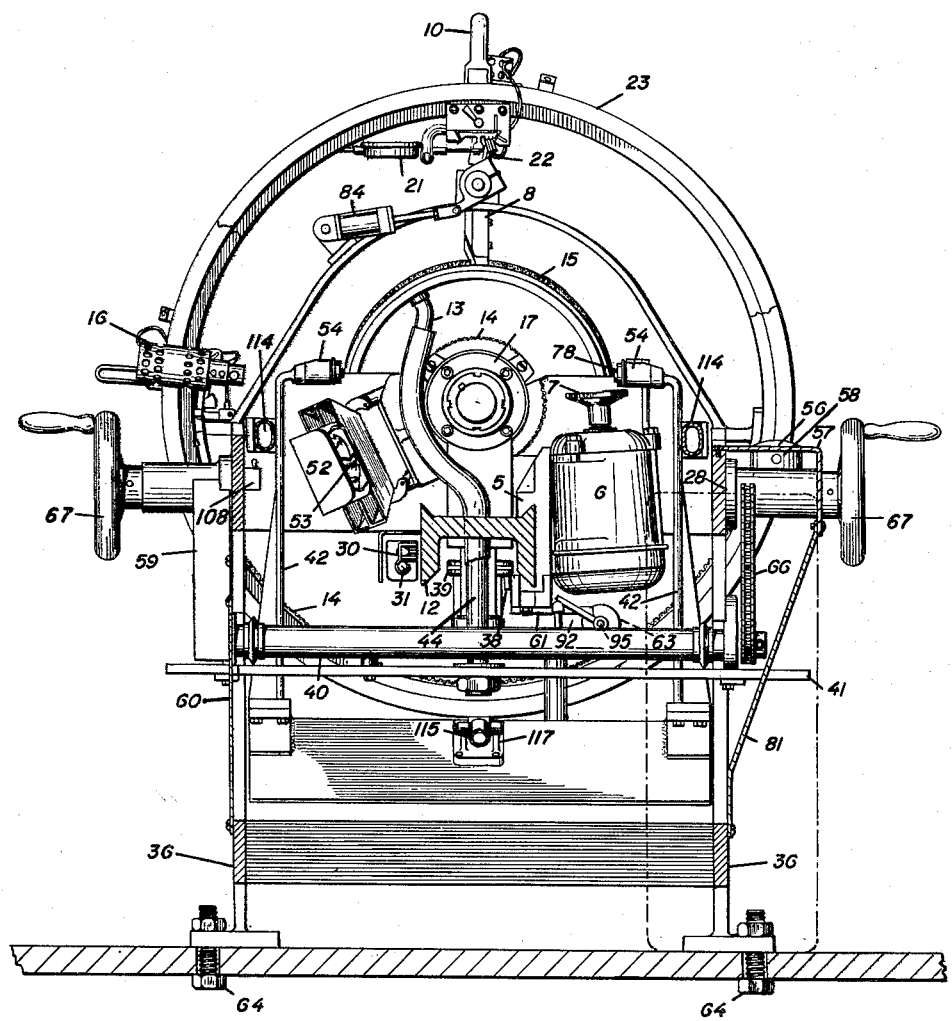
FIGURE 3 is a cross-sectional view taken upon section line 3—3 of FIGURE 1 looking in the direction of the arrows.

The chain clamp 38 as shown particularly in FIGURE 3 clamps the chain 39 to the slides 5 of the longitudinally moved cutters 6 and the operation means 61, shown particularly in FIGURE 3, controls by means of a microswitch 63 the changes in reciprocation of the cutters 6.

Figure 4:
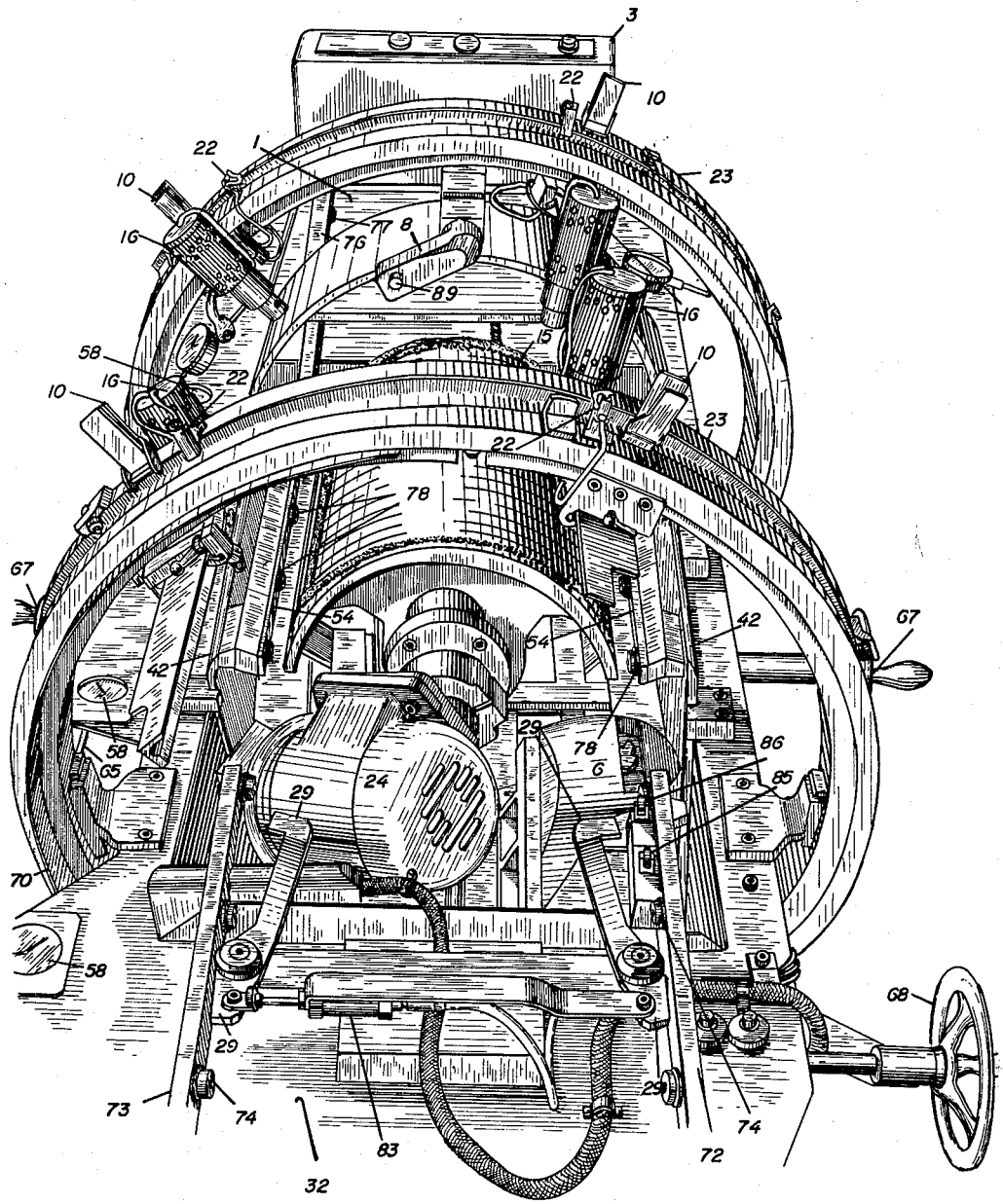
FIGURE 4 is a perspective view of the entire machine looking from the input end.
Figure 5:
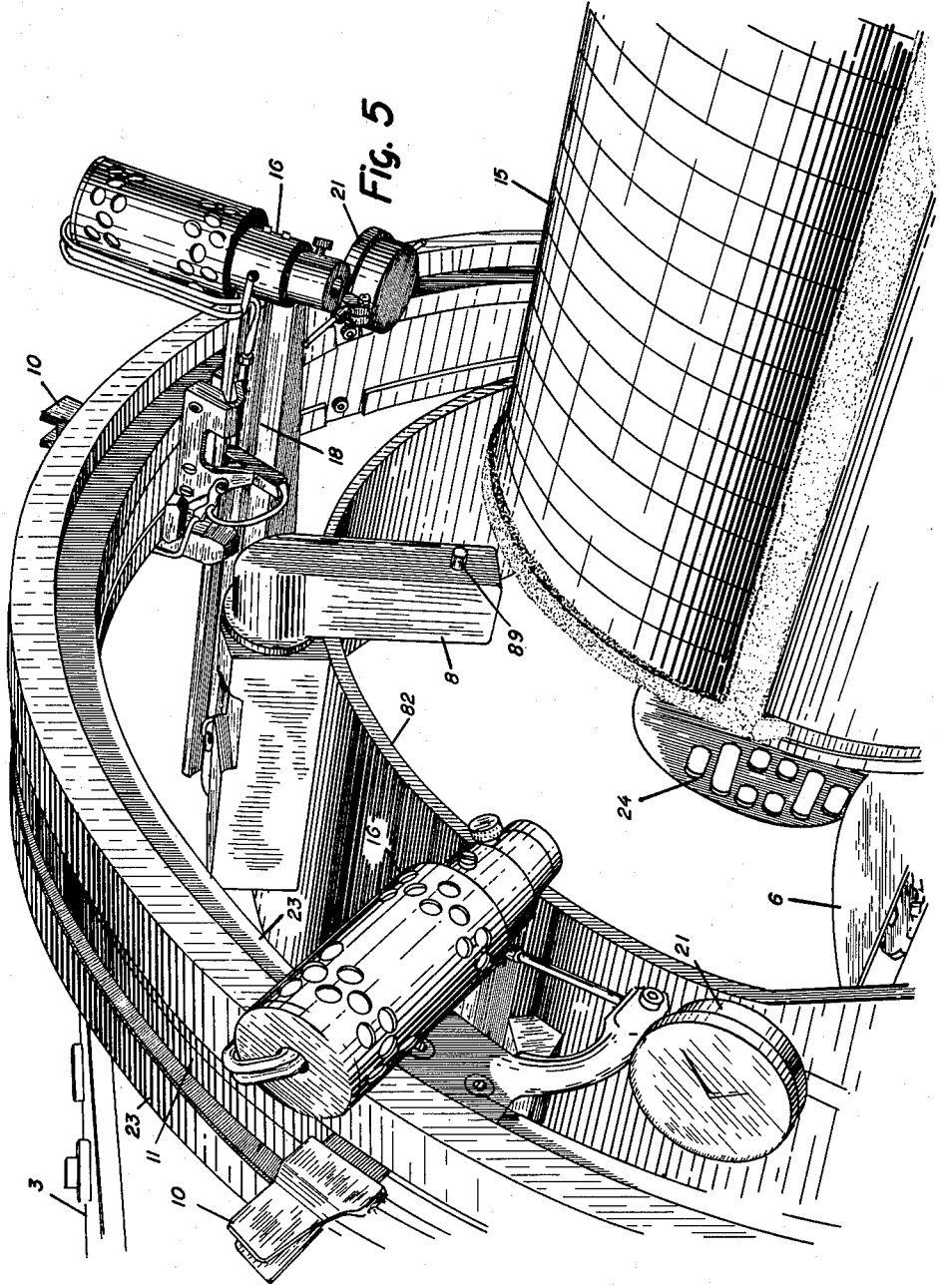
FIGURE 5 is a perspective in greater detail taken at approximately the center of the machine.

The operator places a plate on the rollers 74 on the rails 73 and 72 as shown in FIGURE 4. The stop arms 29 are open and the plate continues to roll on the rollers 74 until it hits the rollers 78 which are fixed to the lifting rails 54 which are shown in FIGURE 4 as being in raised position so that the travel of the plate is on a straight line. Stopping means 8 is, as shown in FIGURE 5, in its lowered position and the plate butts into it. When used for automatic trimming of plates for usual black and white printing, the middle push button on the control box 3 is pushed and locked in this position, thereby lowering the rails 54 and the stopping means 8 being brought to its upper position, and vacuum through vacuum hose 13 is applied to the support 15 to fix the plate to it. By lowering the rails 54 to their lowest position the switch 108 is operated and it starts the motor 49 and when the trimming is ended the motors are stopped, the plate released from the support 15 and the rails 54 lifted so that the plate may roll out of the apparatus and the new plate be fed in. By trimming the following plates the microswitch 89, which is located on the stopping means 8, takes over the function of the middle push button on the control box 3, in such a way that the plates by striking the microswitch 84 automatically, starts the trimming cycle as described above. When used for trimming of color printing plates, the operator pushes the right button on the control box 3 and he manipulates the lamps 16 until the cross hairs of the register marks will line up for all four lamps 16. This is accomplished by moving the lamps forward and backward along the tracks 18 and by moving ring 23 circumferentially. It is to be noted that the motion of the ring 23 entails the motion of transfer cam 70 to a cooperating clock 58. The motors are started. Cutting proceeds to its completion. Lifting rails 54 raise, the plate is now free to travel along rails 75 and 76 by gravity upon the rollers 77.

FIGURE 5 is a projection on a larger scale of a portion of the machine about midway. In this view the stopping means 8 is shown in lowered position to meet the next plate. 82 is a semi-circular support for the stop means 8 of a size so that a plate being trimmed may pass thereunder.

In the positions of the controls, switches, valves, motors, stop means, etc. shown in FIGURE 6 there is no plate in the machine. The stopping means 29 are both in a position which will permit free passage of a plate. This is accomplished by means of cylinder 83 pivoting the stop means 29 in the intermediate bearing about the pivot points shown. Stop means 8 is swung out of the way by the retraction of pneumatic cylinder 84. The current is off to motors 24, 6 and 49.

Figure 7:
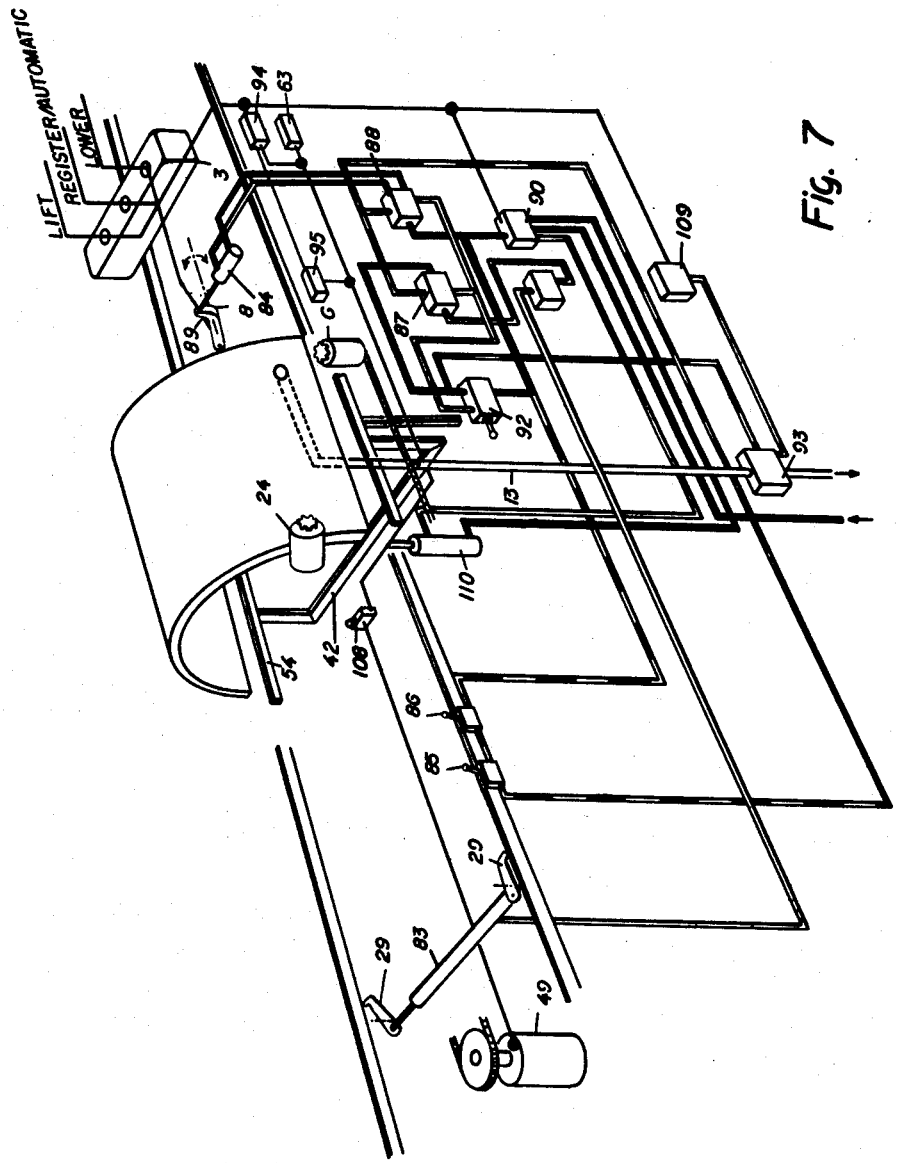
FIGURES 7, 8 and 9 are similar views showing the controls in different positions.

In the position shown of the contols in FIGURE 7 a plate is supposed to be in the machine and has been laid upon the rollers 74. By the action of gravity it will roll down past the open stopping means 29 and having passed the stopping means the plate will impinge upon pneumatic valves 85 and 86. The tripping of these two valves in succession effects the following: Control air is admitted to the valves 87 and 88 each in its turn. Valve 87 is reversed. The valve 88 controls the cylinder 84. In the position of FIGURE 6 valve 87 had been holding working pressure in the cylinder 83 thereby holding the stopping means 29 in open position. With the reversal of the valve 87, however, there is no pressure supplied on the cylinder 83 and therefore it will retract pivoting the stopping means 29 into a position such that no plate may pass. Also reversed is valve 88. Valve 88 had been holding pressure on one end of cylinder piston 84 thereby holding the stopping means up out of the way of any plate which might be passing through the machine. However, reversal of this will result in stopping means 8 pivoting about the point shown so that the plate will be stopped in a position over the support 15.

89 is a microswitch which is operated by the plate striking stopping means 8. Solenoid valve 90 which controls the cylinder 110 is impulsed and reverses. The reversal of solenoid valve 90 reverses the pressure in cylinder 91 which has been supporting the lifting rail support 42 which in turn supports the lifting rails 54 and now lowers same. The lifting rails upon lowering, trip and reverse valve 92. Control pressure is thereby supplied to the vacuum valve 93 which opens supplying vacuum to the line 13. There are one of two possibilities. Either this is the first plate in a series or it is not. Supposing it is. The operator will manipulate the lamps 16 until register marks are registered as explained before. Having completed this he will press the middle button on the control box 3 which supplies current to the motor 49 and the motors 24 and the motors 6. The cutting operation will commence.

The valves 87, 88, 90 and 93 are two-way active, in one position spring loaded and in the other position operated by air pressure.

Figure 9:
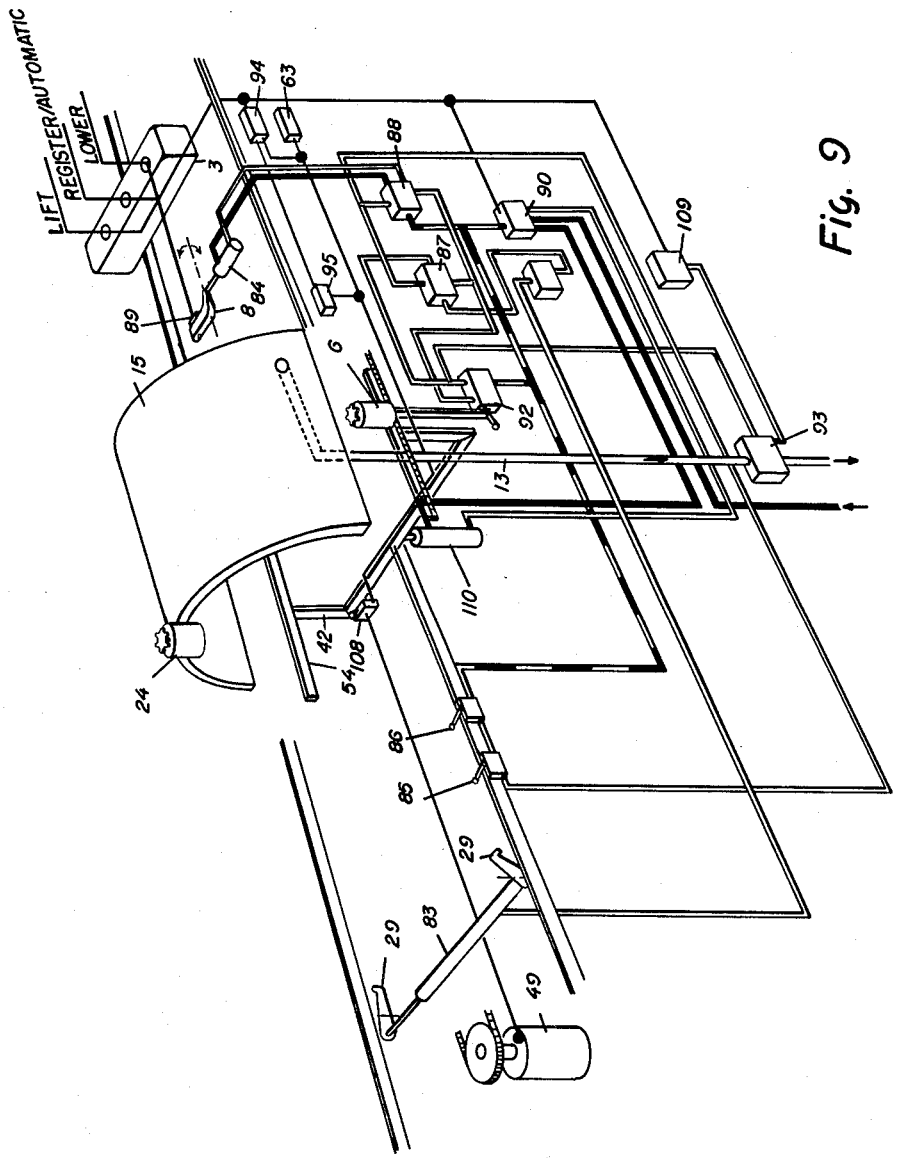

The cutting operation is shown in FIGURE 9 as being midway through. When this cutting operation is completed the motor 6 will impinge upon a microswitch 95 which supplies current thereby impulsing the valve 90, thereby releasing vacuum, raising the lifting rails 54. This is the operation for the first plate in the series.

Figure 8:
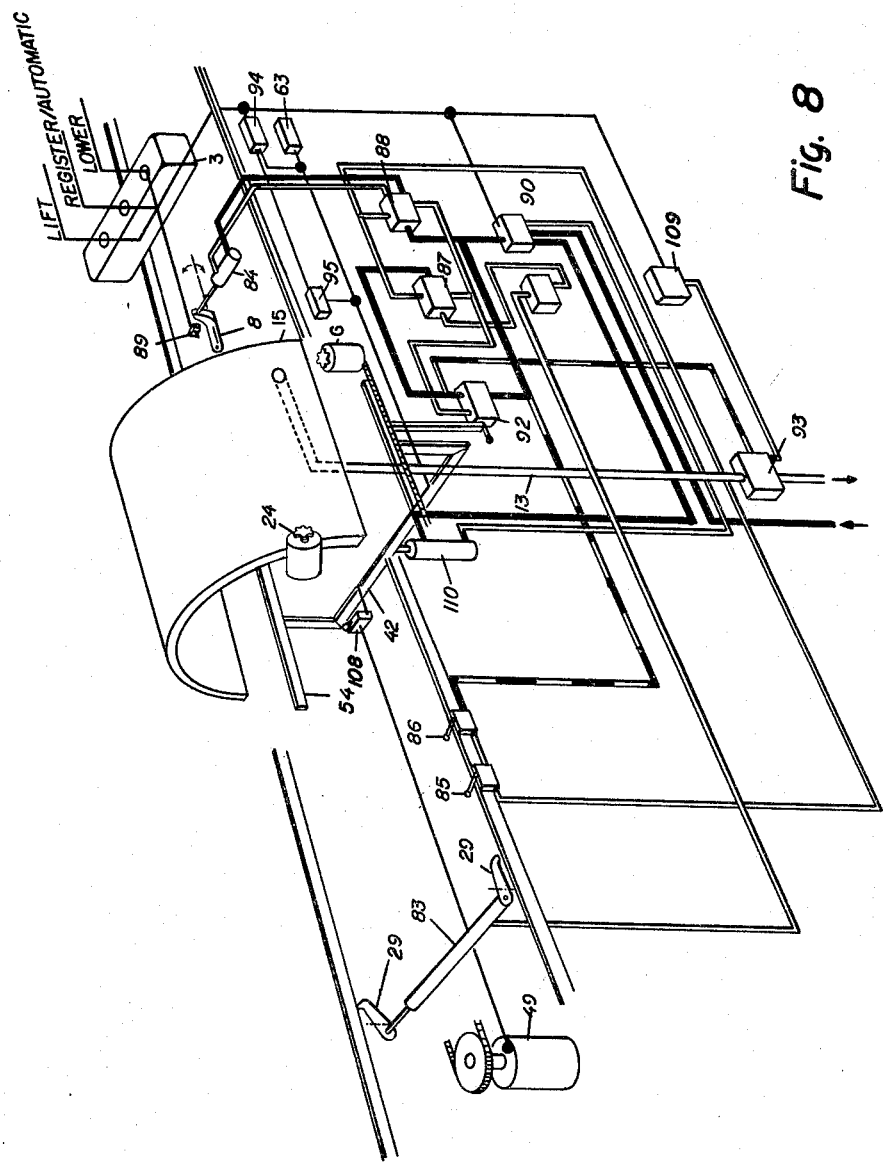

For the second plate or those following, as shown in FIGURE 6, the stopping means 29 are out of the way and the action of the plate is precisely the same. The action as shown in FIGURE 7 is precisely the same. The differences between the first and the second case is merely that in the FIGURE 8 position a pause is required to preregister while for the succeeding plates there is no pause for reregistration.

FIGURES 10, 11, and 12 show the mechanism for manipulating the support 15 on a secondary or tertiary plate so that the plate registration marks will underlie the cross hairs of the lamps 16. In operation, supposing a plate is displaced transversely to the axis of the machine the operator will turn the wheels 67 thereby turning the chain 66 as shown in FIGURE 3. 66 as shown in FIGURE 11 is connected to a shaft 97 by means of pulleys 98. The shaft 97 is threaded along a portion of its length at 99. Threaded portion 99 engages with a two part female threaded round nut 100, 101 held apart by a wedge 102 which is screwed to the sleeve 96 by screws 103. When the shaft 97 is rotated the sleeve 96 will move in a direction transversely to the axis of the machine thereby moving the support bolt 44 since the support bolt 44 is clamped by a clamping means 104 shown in FIGURE 12. In addition sleeve 96 is screwed as at 105, 106, 107 to the indicator 41. The purpose of said indicator being to show the operator the amount of travel transversely to the axis of the machine which the support means 15 has undergone.

In addition to the above, a resume of the operation will be given below.

(1) If there is no plate in the machine then the stopping means 29 shown particularly in FIGURES 2 and 6 to 9 do not operate and the lifting rails 54 remain in the upper position. In such case the vacuum valve 93 is closed.

(2) When the plate passes the valves 85 and 86 the stopping means 29 are operated and the stopping means 8 goes into position.

(3) When the plate abuts the stopping means 8 a microswitch 89 is operated and the valve 90 gets an impulse and will control the pressure supplied to the lifting rails 54 which are then lowered.

(4) When the lifting rails 54 reach the lower position the valve 92 is operated and then vacuum is applied to the support 15 to fasten the plate. The valve 88 reverses and the stopping means 8 is turned thereby. This is for automatic operation. The switch 108 is operated by the rails 54 and starts the motor 49 and operates the vacuum regulator 109 and the switch 94. This is for hand operation. After the plate has been placed in the correct position according to the light registering marks then the feeding motor 49 is manually started.

(5) After the plate has been cut at all four edges the switch 94 is operated and the current to the motor 49 is cut and an impulse is given to the valve 90 which controls the pressure for lifting the rails 54. The microswitch 95 then switches the current to the motor 49 for the next operation.

The plate 43 and the bolts 44 cooperate with the elements 40 and 41 to provide for the transverse movement of the support 15 as the element 45 which is operated by the hand wheels 68 serves for longitudinally adjusting the support 15.

The rails 54 are supported by the lifting frame 42 which is operated pneumatically by the lifting means.

The stopping means 29 are in the position of FIGURE 2 set to allow a plate to pass but when operated the outer parts of such stoppers will turn in front of the front edge of the plate and stop it. All of the cutting is done simultaneously in one operation.

The means for automatically raising and lowering the rails 54 comprises the following:

As shown in FIGURE 1 a pneumatically operated cylinder 110 actuates the rod 111 which is pivotally connected to the rod 112 and such rod is fixed to the rotatably mounted shaft 113. Also fixed to the shaft 113 are the horizontally extending rods 114 which in turn are pivotally connected to the lifting frame 42. Pivotally connected to a leg 80 is a horizontally extending rod 115 which is connected pivotally at 116 to a bracket 117 mounted upon the lifting frame 42.

The chain 50, see FIGURE 1, drives a gear located upon a shaft within the bearing 120. The upper end of such shaft carries a bevel gear 121 which drives the two bevel gears 122 and 123 in opposite directions. The gears 122 and 123 are fixed to shafts 124 of which only one is seen at the left hand side in FIGURE 1 because the motor 24 has been omitted from this side for greater clarity.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A curved stereotype plate registering and trimming machine comprising a central unit, a plate carrying support in said unit, means for raising and lowering said plate from and to said support, vacuum means cooperating with said support for securing a curved stereotype plate to said support, four cutters mounted movably on said unit, means for operating each of said cutters simultaneously each along one side of said plate, a plurality of projector units fixed to spaced points of said unit, each including means for projecting an image of a mark onto a plate on said support, and means for adjustably moving each of said projector units relative to said unit.

2. A curved stereotype plate registering and trimming machine comprising a central unit, a plate carrying support in said unit, means for raising and lowering said plate from and to said support, vacuum means cooperating with said support for securing a curved stereotype plate to said support, four cutters mounted movably on said unit, means for operating each of said cutters simultaneously each along one side of said plate clockwise and counterclockwise, a plurality of projector units fixed to spaced points of said unit, each including means for projecting an image of a mark onto a plate on said support, and means for adjustably moving each of said projector units relative to said unit.

3. A curved stereotype plate registering and trimming machine comprising a central unit, a plate carrying support in said unit, means for raising and lowering said plate from and to said support, vacuum means cooperating with said support for securing a curved stereotype plate to said support, four cutters mounted movably on said unit, means for operating each of said cutters simultaneously each along one side of said plate, a plurality of projector units fixed to spaced points of said unit, each including means for projecting an image of a mark onto a plate on said support, means for adjustably moving each of said projector units relative to said unit and means for feeding said plate from said support by gravity.

4. A curved stereotype plate registering and trimming machine comprising a central unit, a plate carrying support in said unit, means for raising and lowering said plate from and to said support, vacuum means cooperating with said support for securing a curved stereotype plate to said support, four cutters mounted movably on said unit, means for operating each of said cutters simultaneously each along one side of said plate, a plurality of projector units fixed to spaced points of said unit, each including means for projecting an image of a mark onto a plate on said support, means for adjustably moving each of said projector units relative to said unit and means on said unit for sequentially controlling the feed of a plate to said support, the operation of said vacuum means, the raising and lowering of said plate from and to said support and said means for operating said cutters.

5. A curved stereotype plate registering and trimming machine comprising a central unit, a plate carrying support in said unit, means for raising and lowering said plate from and to said support, vacuum means cooperating with said support for securing a curved stereotype plate to said support, four cutters mounted movably on said unit, means for operating each of said cutters simultaneously each along one side of said plate, a plurality of projector units fixed to spaced points of said unit, each including means for projecting an image of a mark onto a plate on said support, means for adjustably moving each of said projector units relative to said unit, means for feeding said plate from said support by gravity and means on said unit for controlling the feed of a plate to said support, the operation of said vacuum means, the raising and lowering of said plate from and to said support and said means for operating said cutters.

6. A curved stereotype plate registering and trimming machine comprising a central unit, a plate carrying support in said unit, means for raising and lowering said plate from and to said support, vacuum means cooperating with said support for securing a curved stereotype plate to said support, four cutters mounted movably on said unit, means for operating each of said cutters simultaneously each along one side of said plate, a plurality of projector units fixed to spaced points of said unit, each including means for projecting an image of a mark onto a plate on said support, means for adjustably moving each of said projector units relative to said unit, means for feeding a plate to said unit, a pair of inclined tracks having rollers cooperating with said support receiving said plate from said feeding means, means for raising and lowering said tracks to position a plate on said support and remove the same therefrom.

7. A curved stereotype plate registering and trimming machine comprising a central unit, a plate carrying support in said unit, means for raising and lowering said plate from and to said support, vacuum means cooperating with said support for securing a curved stereotype plate to said support, four cutters mounted movably on said unit, means for operating each of said cutters simultaneously each along one side of said plate, a plurality of projector units fixed to spaced points of said unit, each including means for projecting an image of a mark onto a plate on said support, means for adjustably moving each of said projector units relative to said unit, means for feeding a plate to said unit, a pair of inclined tracks having rollers cooperating with said support receiving said plate from said feeding means, parallelogram means for raising and lowering said tracks to position a plate on said support and remove the same therefrom.

References Cited by the Examiner

UNITED STATES PATENTS

| | | | |
|---|---|---|---|
| 465,351 | 12/91 | Cummings | 29—21 |
| 653,050 | 7/00 | Winter | 29—21 |
| 721,122 | 2/03 | Wood | 90—26 |
| 2,085,908 | 7/37 | Huck | 29—21 |
| 2,293,091 | 8/42 | Wood | 29—21 |
| 2,364,032 | 11/44 | Wood | 29—21 |
| 2,668,346 | 2/54 | Tollison | 29—21 |

RICHARD H. EANES, JR., *Primary Examiner.*